Figure 1:
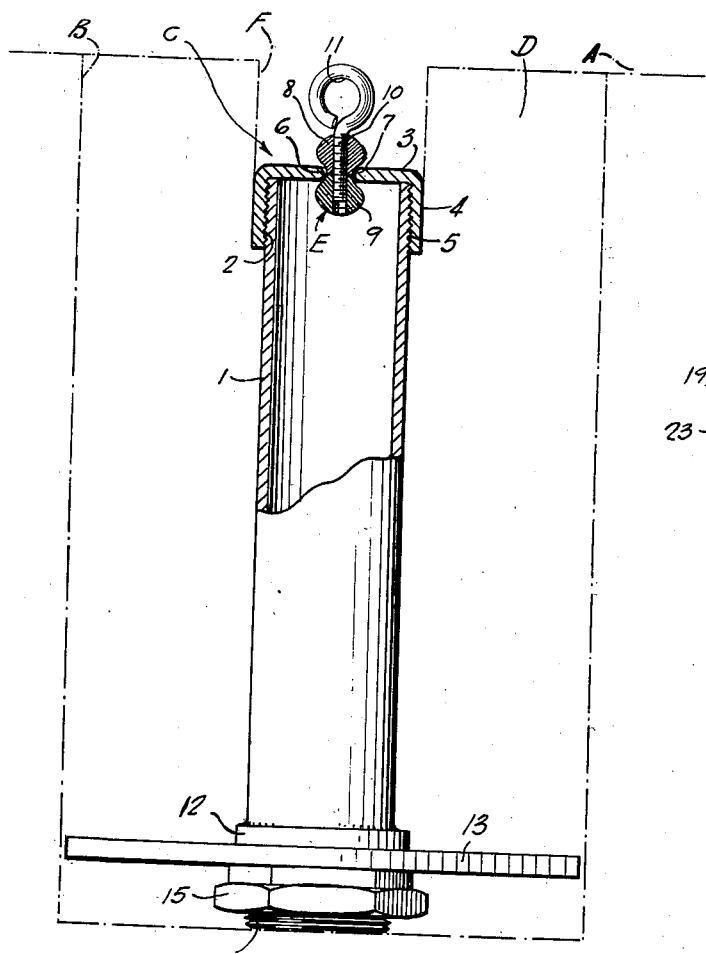

March 30, 1943.   W. L. HAYDEN   2,314,941
ANIMAL EXERCISING ANCHORAGE
Filed April 21, 1941

INVENTOR.
WILLIAM L. HAYDEN.
BY Joshua&H.Totts

Patented Mar. 30, 1943

2,314,941

UNITED STATES PATENT OFFICE 2,314,941

ANIMAL EXERCISING ANCHORAGE

William L. Hayden, Bryn Mawr, Pa.

Application April 21, 1941, Serial No. 389,546

1 Claim. (Cl. 119—122)

This invention relates to animal exercising anchorages.

It is well-known that animals as well as human beings require exercise if they are to remain in a state of good health and disposition. Due to the congested conditions of many localities and to the hazards of modern traffic, it is no longer possible for domesticated animals, such as horses and dogs, to be permitted to run freely without encountering the dangers of injury and possible loss.

In many instances it is not feasible or desirable to construct an adequate enclosure to furnish the proper restraint to insure safety. It is also not feasible for the owner to devote a sufficient amount of time to the exercising of the animal under close supervision to insure safety.

In many localities it has become customary for dog owners to tether their pets to posts, trees and the like upon the lawn so that they may obtain fresh air and exercise during the absence of the owner. In many instances the pet becomes entangled in his leash, or wraps the same around the post or tree to such an extent as to decrease greatly his freedom of action, which is necessary for proper exercise. Others have conceived the idea of stretching a clothes line or similar attenuated article between spaced fixed points and then by means of an encircling ring, securing the pet to the line so that he may have a larger measure of freedom than he would have otherwise. This type of line is usually raised a considerable distance from the earth and, in many instances, pets have become entangled in their leashes and with the line to such an extent that they have become choked to death or injured severely in other ways in trying to free themselves from such entanglement.

An object of this invention is the provision and arrangement of a device with respect to the exercising area which will permit the proper restraint of an animal to provide safety from injury due to traffic conditions and, at the same time, will provide an anchorage which will prevent the animal from so entangling himself with his leash and the anchorage as to create the hazards above-pointed out.

A further object is the provision of a device in which proper swiveling and rocking action will be insured to the end that a desired maximum exercising area will be provided without appreciable discomfort to the animal.

A further object is a simple and yet highly effective means for securing the anchorage within the exercising area.

Other and more detailed objects will appear hereinafter as the description of the invention in connection with the drawing proceeds.

The invention, therefore, comprises an exercising anchorage arranged and secured with respect to the exercising area to provide safety and restraint, and provided with means for effectively securing the anchorage to the exercising area, and with swivel means for the secure and yet desired relatively freely movable attachment of a tethering leash.

Figure 3:
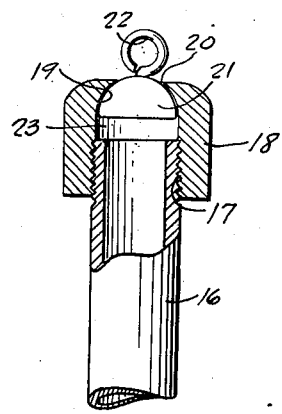
Figure 2:
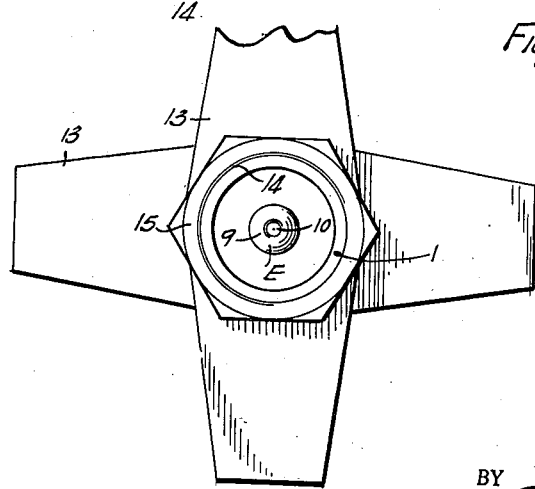

For a full and more complete understanding of the invention, reference may be had to the following description and accompanying drawing, wherein:

Figure 1 is a side elevational view of one form of the invention, with parts broken away showing the manner of securing the anchorage in the exercising area, Figure 2 is a bottom plan view of the device shown in Figure 1, and Figure 3 is a view partly in section and partly in side elevation showing a modified form of the invention.

Referring now to the drawing, A represents an exercising area such as a lawn, in which is provided a pit B into which the anchorage device, generally indicated at C, is placed, and D represents a filling of tamped bonded gravel or the like. The anchorage device comprises generally a cylindrical pipe-like stake part 1 which is provided at its top with a threaded portion 2 for engagement with a cap 3 having a depending flange 4 which is provided with an interior thread 5 of a nature complemental to the thread 2.

Substantially centrally of cap 3 is provided an annular opening 6, the periphery of which is beveled on the inside and outside as well to provide a rocking bearing surface 7. A swivel plug generally indicated at E is formed of a pair of complemental parts 8 and 9, each of which carries a reduced neck portion which engages the bearing surface 7. Each of the plug parts 8 and 9 is provided with a central threaded bore into which is screwed the threaded rod 10, the outer end of which is bent into a circular formation to provide an eye 11 through which the end of a leash or the customary snap fastener may be passed for secure tethering.

It is evident that the plug parts 8 and 9 may rock on the bearing surface 7. Thus the eye 11 is free to move in any direction in which it may be pulled by the animal tethered by the leash. It is this freedom of movement which insures against entanglement.

It will be noted that the bonded gravel D leaves a small cylindrical depression F above cap 3, but it is also noted that the top of eye 11 is flush with or below the upper surface of the surrounding bonded gravel and exercise area.

Adjacent the lower end of the stake portion 1 an annular bead 12 is provided as a stop for cross-anchoring arms 13 which are of identical construction and are provided with large annular openings adjacent their center portions for the reception of the threaded end 14 of stake portion 1. A threaded nut 15 is screwed onto the portion 14 so as to secure and clamp the cross arms 13 against the bead 12.

In a modified form shown in Figure 3, a stake portion 16, similar to the stake portion 1 of Figure 1, is also provided with an external thread at its upper end for engagement by the internal thread 17 of a cap 18. A spheroidal bearing surface 19 is provided on the inside of cap 19 around an annular opening 20 in the top of cap 18. A hemispherical plug 21 thus provides a bearing surface complemental to the surface 19 and a small portion of the plug 21 will thus protrude through annular opening 20 when the parts are assembled.

An eye 22 is provided by a rod which is anchored to the plug 21 in a manner similar to the rod portion 7 of Figure 1. Beneath the bottom of plug 21 is provided a cylindrical tolerance space 23, and due to this space, a large amount of swiveling action on the part of plug 21 is accommodated. Since the modified form of Figure 3 is secured in the exercise area in a manner similar to the form of Figure 1, with the top of eye 22 in extended position flush with or below the surface of the exercise area, it can be seen that substantially universal swiveling to the needed degree is provided, and there is no part of the anchorage left above the surface about which a leash could become wrapped loosely and then drawn to effect an undesirable tightening.

It is thought that installation and operation of the device are easily understood from the foregoing description, but it can be seen that the uppermost portion of each of the forms described is below the surface of the exercise area and thus successive trips of an animal around the center of his exercise area would not cause a wrapping of his leash in circular convolutions which would lessen the amount of freedom given by his leash, as would be the case with a stake or tree ordinarily employed at present. Also, since the device is anchored below the surface of the exercise area, the possibilities of death or injury, which follow from the use of an elevated line, are avoided, and the owner may leave an animal secured to the anchorage with a feeling that, within the confines of the circle formed by a leash rotated on the anchorage as a center, the animal will have freedom for exercise without being subjected to the hazards of other forms presently employed.

While the preferred forms of the invention are hereinbefore set forth, it is to be clearly understood that the invention is not to be limited to the exact constructions illustrated and described, because various modifications of these details may be provided in putting the invention into practice, within the purview of the appended claim.

I claim:

A tether anchoring device comprising an anchor adapted to be positioned within an opening of a corresponding shape to the anchor so that the top of the anchor is below the outer edge of the opening, an aperture in the top of the anchor having a convex wall, a plug positioned in the aperture, said plug having a concave groove at substantially the mid-portion thereof corresponding in curvature to and loosely receiving the wall of the aperture, and an eye secured in the plug, said eye being within and substantially entirely below the outer edge of the opening and adapted to be secured to a tether, the plug and aperture being so constructed and arranged whereby pull on a tether in any direction above the surface of the top edge of the opening will cause tilting of the plug and eye to prevent entangling of the tether with any part of the eye or anchor structure.

WILLIAM L. HAYDEN.